March 22, 1955 — R. B. EDELMANN — 2,704,450
THERMOHYDROMETER
Filed March 17, 1951 — 2 Sheets-Sheet 1
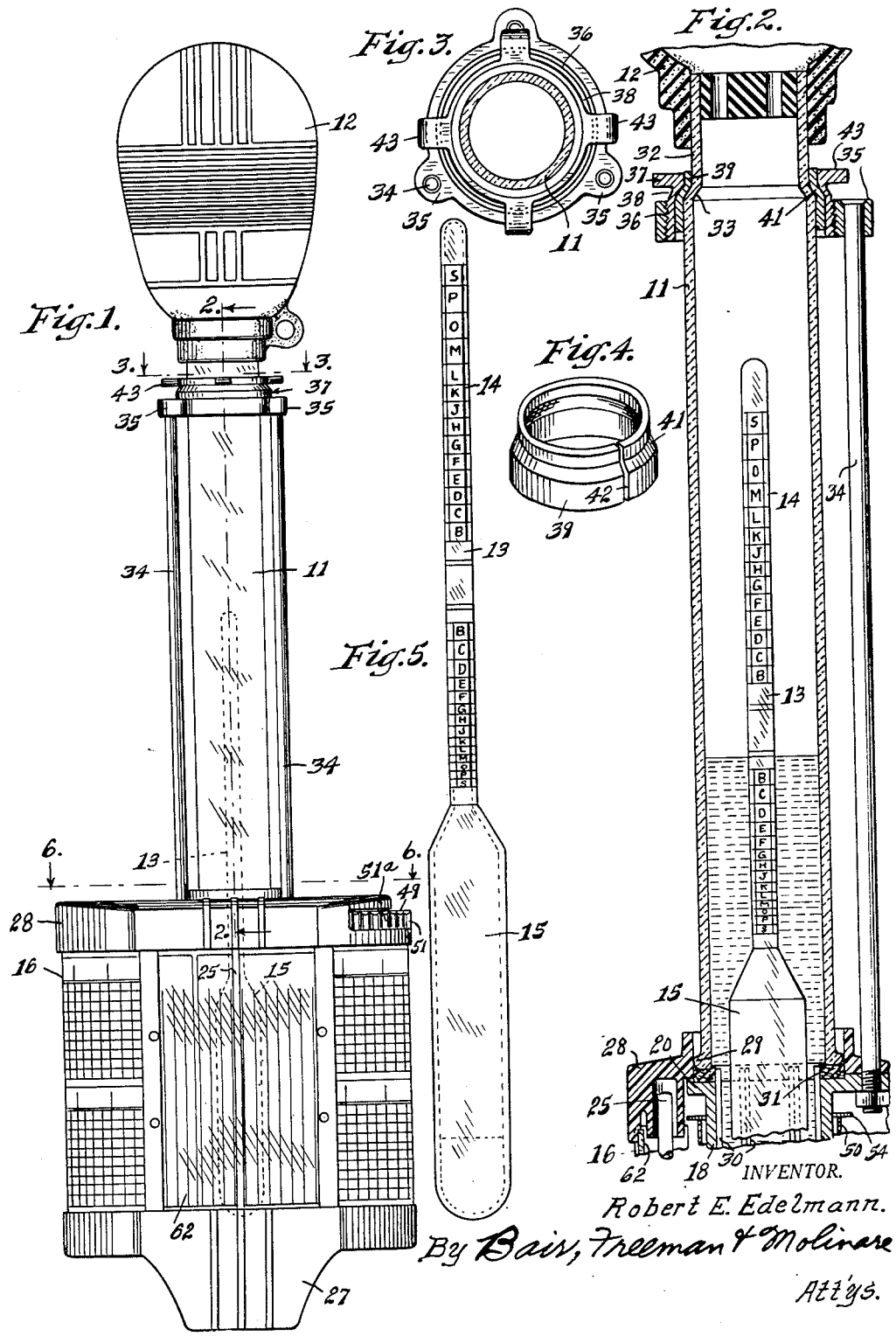
INVENTOR.
Robert E. Edelmann.
By Bair, Freeman & Molinare
Att'ys.

March 22, 1955   R. B. EDELMANN   2,704,450
THERMOHYDROMETER
Filed March 17, 1951   2 Sheets-Sheet 2
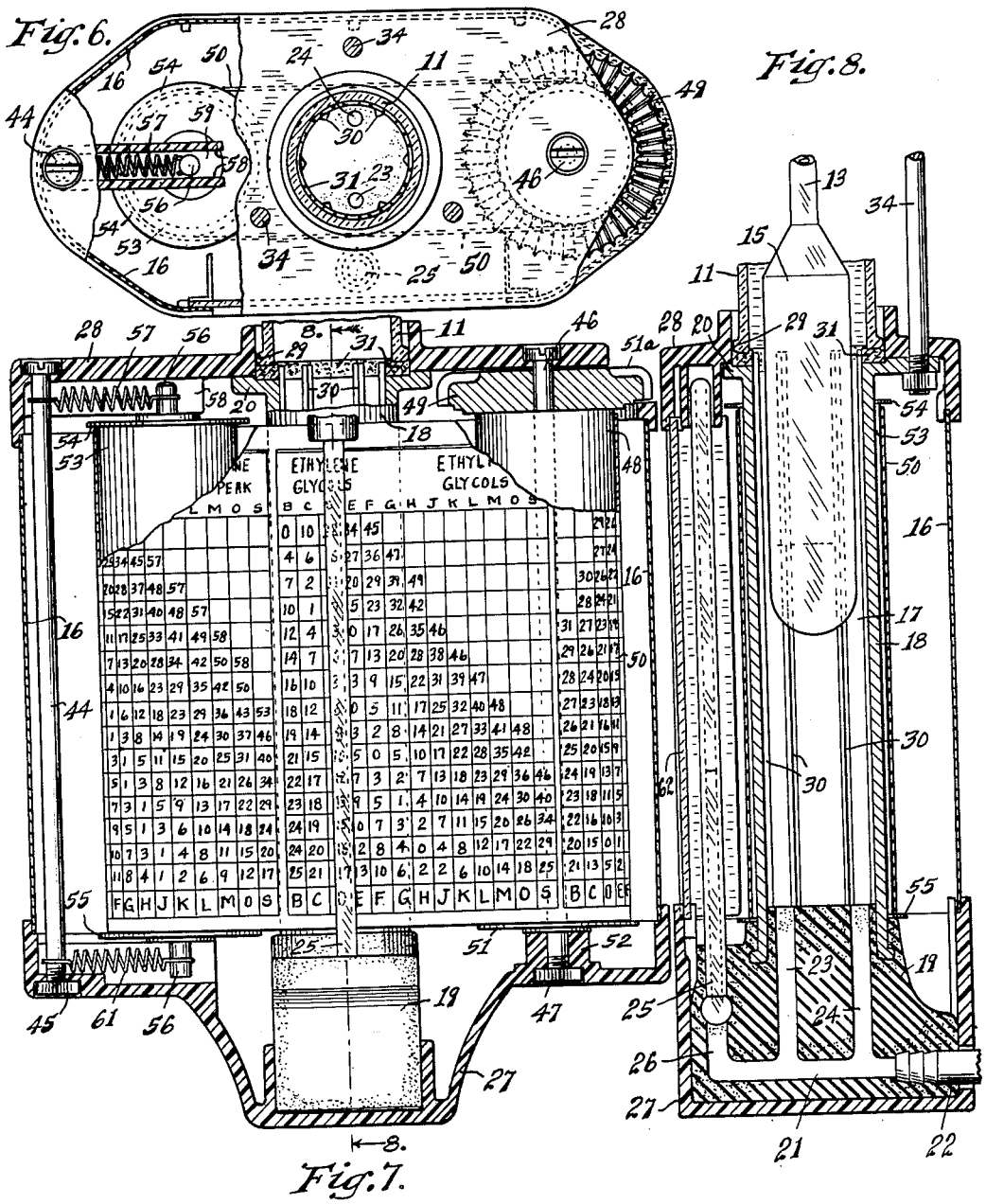
INVENTOR.
Robert E. Edelmann.
By Bair, Freeman & Molinare
Att'ys.

United States Patent Office 2,704,450
Patented Mar. 22, 1955

2,704,450

THERMOHYDROMETER

Robert B. Edelmann, Chicago, Ill., assignor to E. Edelmann & Co., Chicago, Ill., a corporation of Illinois Application March 17, 1951, Serial No. 216,158

7 Claims. (Cl. 73—34)

This invention relates to improvements in thermohydrometers and particularly to a device of this character intended for use in testing a plurality of liquid solutions having different specific gravities, such as radiator antifreeze solutions, and to provide temperature correction means immediately available for each solution.

An object of the invention is to provide a hydrometer comprising a liquid container having a specific gravity indicator capable of use with a plurality of liquid solutions and to have an improved movable correction scale or chart for each of the solutions to be tested and a single temperature responsive means which cooperates with the movable scale and which is positioned to be influenced by the temperature of the liquid to be tested.

A further object of the invention is to provide an improved construction for assembling the transparent hydrometer barrel with respect to the remainder of the instrument.

Another object of the invention is to provide a hydrometer which is simple and inexpensive in construction, is substantially proof against error or confusion in use and reading and has the parts thereof so made and assembled that the instrument will prove durable in ordinary use.

A further object of the invention is to provide a chart for determining or calculating the quantity of additional solution to be added to a radiator, or the like, for correcting the specific gravity to that required for the radiator to stand a different temperature than the temperature it tests at, such chart being in the form of a tensioned belt which is moved on spools or rollers and wherein such movement may be readily effected from the outside of the hydrometer casing.

With these and other objects in view, my invention consists in the construction, arrangement and combination of the various parts of my device whereby the objects contemplated are attained, as hereinafter more fully set forth, pointed out in my claims and illustrated in the accompanying drawings wherein—

Figure 1 is a plan view of a hydrometer illustrating the invention,

Figure 2 is a partial sectional view taken on the line 2—2 of Figure 1,

Figure 3 is a sectional view taken on the line 3—3 of Figure 1,

Figure 4 is a perspective view of a split ring which is utilized for assembling the hydrometer, Figure 5 is a plan view of a hydrometer float and stem, Figure 6 is a sectional view of a hydrometer taken on line 6—6 of Figure 1 with portions broken away to better illustrate the construction, Figure 7 is a vertical sectional view of the lower hydrometer casing with portions broken away to better illustrate the invention, and Figure 8 is a vertical sectional view of the hydrometer taken substantially on line 8—8 of Figure 7, with the thermometer and hydrometer float shown in full lines.

Referring specifically to the drawings for a detailed description of the invention, 11 indicates the barrel of the hydrometer which is made of glass or other transparent rigid material. The upper end of the barrel 11 is provided with a rubber bulb 12 which is utilized for sucking liquid to be tested into the hydrometer and for thereafter forcing such liquid out. A hydrometer float is shown at 13 and comprises a graduated stem 14 with suitable indicia thereon and a weighted float member 15 of standard construction.

A hydrometer casing, which is attached to the lower end of the barrel 11, is designated generally at 16 and is preferably made of sheet metal. In the embodiment of the invention shown, the sheet metal is generally oval in shape. A tube 18, preferably formed of metal, is contained within the lower hydrometer casing 16 and provides a chamber 17 in which liquid to be tested is adapted to be drawn, which chamber 17 communicates with the open bottom of the barrel 11 so that the liquid to be tested may freely flow therebetween. The metal tube 18 is preferably provided with a plurality of ribs 30 which serve to center the float 15 of the specific gravity indicating element 13.

A relatively heavy rubber member 19 is secured to the bottom of the tube 18 and is provided with a horizontal passage 21 which communicates with the nipple 22 of a supply hose, not shown, through which supply hose and passage 21 the liquid to be tested is drawn or expelled when the bulb 12 is operated. The passage 21 communicates with two vertical passages 23 and 24 which in turn communicate with the chambers 17 formed by the tubular member 18.

The rubber member 19 also has a vertical passage 26 therein and a thermometer 25 is inserted partially into the passage 26. The passage 26 also communicates with the horizontal passage 21 so that the liquid to be tested will reach the bulb of the thermometer 25 and the thermometer 25 will thus indicate the temperature thereof.

The sheet metal casing 16 is provided with a base 27 and a cap 28, both of which are preferably formed of plastic material and are provided with suitable grooves for receiving the edges of the metal container 16.

The bottom of the barrel 11 is provided with a lip 29 and the top of the metal tube 18 is provided with a horizontal flange 20. A rubber washer 31 is secured to the top of the flange 20 and the bottom of the barrel 11, with the lip 29, are adapted to be sealed against the washer 31.

In order to assemble the barrel 11 with the rest of the instrument and to effect the aforesaid seal, the barrel 11 is provided with a reduced portion 32 at its upper end and an inclined shoulder 33. A number of vertical rods 34, preferably three in number, are secured to the cap 28 in any suitable manner and surround the barrel 11. Rods 34 are secured to a collar 35 at the top thereof, which collar also surrounds the barrel 11 and is preferably formed of metal or plastic. The collar 35 is provided with internal threads as shown at 36 in Figure 2. A nut, also preferably formed of metal or plastic, is shown at 37, which nut is externally threaded to cooperate with the threads 36 on the collar 35. The nut is also provided with an inclined shoulder 38 which is substantially on the same angle as the shoulder 33 on tube 11.

A lock washer 39, provided with an inclined shoulder 41, is disposed between the nut 37 and the barrel 11 and is preferably formed of a resilient material such as plastic or rubber. The washer 39 is provided with a slit so that it may readily expand and contract, so as to tightly grip the barrel 11 when the nut 37 is tightened, and move freely with respect to the barrel when the nut 37 is loosened.

In order to assemble the barrel 11 with the thermometer of the instrument, it is only necessary to slide the nut 37 and washer 39 over the reduced upper end 32 of barrel 11, then insert the barrel 11 through the collar 35 until the bottom thereof contacts washer 31. Nut 37 is then tightened, finger pieces 43 being provided for this purpose, and the barrel 11 is thus forced into sealing relation with the washer 31 in cap 28.

Referring now to the internal construction of the container 16, the cap 28 and base 27 are held together by studs 44 and 46, having nuts 45 and 47 secured respectively to the lower ends thereof.

The stud 46 is stationary and provides a bearing for a spool 48 secured at its upper end to a plastic disc 49, which is knurled at 51a. An endless belt 50, formed of paper, linen or other material, is wrapped around the spool 48 and also around a spool 53 at the opposite side of the casing 16. The bottom of the spool 48 rests on a stud 52 formed on the base 27. Preferably, the spool is provided with a plastic base 51 which is supported by the stud 52 and which rotates easily when the disc 49 is rotated by the user. It is noted that the disc 49 has a portion thereof which extends exteriorly of the cap 28, as best shown in Figures 1 and 7.

The spool 53 is preferably provided with plastic end members 54 and 55. Shaft 56 extends through the plastic end members 54 and 55 and provides a bearing therefor since the shaft 56 does not itself rotate. The upper end of shaft 56 is resiliently held in position in a channel 59, formed by ribs 58, by a spring 57 which is secured to the upper end of the shaft 56 and to the upper end of the stud 44. The lower end of the shaft 56 is held in tension by a spring 61 which is secured to the lower end of the shaft 56 and to the lower end of stud 44.

It is noted that the endless belt 50 has suitable indicia thereon for various anti-freeze compounds and has temperature scales to indicate the temperature at which the liquid to be tested will freeze, depending upon the specific gravity of the liquid and the temperature thereof.

After the spools 48 and 53 have been properly assembled with the endless belt 50 thereon, rotation of the disc 49 obviously causes the belt 50 to travel in either direction depending upon the direction the disc 49 is moved. The thermometer 25 is positioned in back of a window 62 which is provided on one side of the casing 16. Also the indicia on the endless belt 50 which is opposite the window may be observed by looking therethrough. It will be noted that the endless belt 50 is always maintained in tension by the springs 57 and 61. In addition, it is apparent that the assembly of the entire instrument, and particularly the assembly of the barrel 11 with the remainder of the instrument, is extremely simple and results in a good seal.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a collar substantially surrounding and spaced from the barrel adjacent the shoulder, means for connecting the base member and said collar together and means cooperating with the collar and said shoulder on the barrel for urging the barrel towards said sealing surface on the base member.

2. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a collar substantially surrounding and spaced from the barrel adjacent the shoulder, means for connecting the base member and said collar together and means cooperating with the collar and said shoulder on the barrel for urging the barrel towards said sealing surface on the base member, a nut threadably engaging with the collar and a split washer positioned between the nut and the barrel.

3. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a collar substantially surrounding and spaced from the barrel adjacent the shoulder, means for connecting the base member and said collar together and means cooperating with the collar and said shoulder on the barrel for urging the barrel towards said sealing surface on the base member, a nut threadably engaging with the collar and a split washer positioned between the nut and the barrel, said nut and split washer being shaped to conform to the shoulder on the barrel.

4. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a retaining member spaced from the barrel adjacent the shoulder, means for connecting the base member and said retaining member together and means cooperating with the retaining member and said shoulder on the barrel for urging the barrel toward said sealing surface on the base member, said last means comprising an annular member engageable with the retaining member and a washer disposed between the annular member and the barrel.

5. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a retaining member spaced from the barrel adjacent the shoulder, means for connecting the base member and said retaining member together and means cooperating with the retaining member and said shoulder on the barrel for urging the barrel toward said sealing surface on the base member, said last means comprising an annular member engageable with the retaining member and a washer disposed between the annular member and the barrel, said annular member and said washer being shaped to conform to the shoulder on the barrel.

6. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a retaining member spaced from the barrel adjacent the shoulder, means for connecting the base member and said retaining member together and means cooperating with the retaining member and said shoulder on the barrel for urging the barrel toward said sealing surface on the base member, said last means comprising an annular member engageable with the retaining member to force the barrel towards the base.

7. A hydrometer comprising a transparent barrel having upper and lower open ends, a base member having a passage therein for conveying liquid to be tested to and from the bottom of said barrel, a collapsible bulb attached to the top of the barrel to lift fluid into and eject fluid from said barrel, a hydrometer float in said barrel to indicate the specific gravity of the liquid to be tested, a surface provided on said base member against which the bottom of the barrel is adapted to seal, a shoulder formed adjacent the top of the barrel, a collar substantially surrounding and spaced from the barrel adjacent the shoulder, means for connecting the base member and said collar together and means cooperating with the collar and said shoulder on the barrel for urging the barrel towards said sealing surface on the base member, and a nut threadably engaging with the collar.

References Cited in the file of this patent

UNITED STATES PATENTS

| Number | Name | Date |
| --- | --- | --- |
| 219,522 | Rhule, Jr. | Sept. 9, 1879 |
| 1,077,736 | Morrison | Nov. 4, 1913 |
| 1,118,950 | Robinson | Dec. 1, 1914 |
| 1,391,000 | Meyer | Sept. 20, 1921 |
| 1,405,094 | Biebow | Jan. 31, 1922 |
| 2,577,669 | Wilson | Dec. 4, 1951 |